United States Patent
Nakazawa

(10) Patent No.: US 8,027,559 B2
(45) Date of Patent: Sep. 27, 2011

(54) IMAGE REPRODUCING APPARATUS AND CONTROL METHOD THEREFOR

(75) Inventor: Kazuhiko Nakazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 964 days.

(21) Appl. No.: 11/951,258

(22) Filed: Dec. 5, 2007

(65) Prior Publication Data

US 2008/0138046 A1 Jun. 12, 2008

(30) Foreign Application Priority Data

Dec. 8, 2006 (JP) ................................. 2006-332409

(51) Int. Cl.
*H04N 5/765* (2006.01)
*H04N 5/93* (2006.01)
*H04N 5/917* (2006.01)

(52) U.S. Cl. ......... 386/200; 386/231; 386/353; 386/355

(58) Field of Classification Search .................. 386/200, 386/230, 231, 239, 355, 356, 353
See application file for complete search history.

(56) References Cited

U.S. PATENT DOCUMENTS

| | | | | |
|---|---|---|---|---|
| 7,376,331 B2 * | 5/2008 | Cheng | ............................ | 386/353 |
| 2002/0012048 A1 * | 1/2002 | Yamagishi | .................... | 348/207 |
| 2007/0147688 A1 * | 6/2007 | Mathew | ......................... | 382/232 |
| 2008/0031588 A1 * | 2/2008 | Leung et al. | .................... | 386/83 |

FOREIGN PATENT DOCUMENTS

| | | |
|---|---|---|
| JP | 09-284614 A | 10/1997 |
| JP | 2001-086277 A | 3/2001 |
| JP | 2001-257969 A | 9/2001 |
| JP | 2002-320116 A | 10/2002 |
| JP | 2003-189007 A | 7/2003 |
| JP | 2004-310178 A | 11/2004 |
| JP | 2005-318321 A | 10/2005 |

* cited by examiner

*Primary Examiner* — Thai Tran
*Assistant Examiner* — Hung Q Dang
(74) *Attorney, Agent, or Firm* — Canon U.S.A., Inc., I.P. Division

(57) ABSTRACT

An image reproducing apparatus is connected to a display device via a video data transmitting unit and a file data transmitting unit and is driven by a battery. The image reproducing apparatus calculates a first electric power required to transmit video data to the display device and a second electric power required to transmit file data to the display device, and acquires a remaining amount of electric power in the battery. Then, the image reproducing apparatus judges whether the acquired remaining amount of electric power in the battery is equal to or larger than the first electric power, is equal to or larger than the second electric power but smaller than the first electric power, or is smaller than the second electric power, and determines whether the image data is to be transmitted as the video data or the file data.

8 Claims, 3 Drawing Sheets

IMAGE REPRODUCING APPARATUS AND CONTROL METHOD THEREFOR

BACKGROUND OF THE INVENTION

1. Field of the Invention

The present invention relates to an image reproducing apparatus and a control method therefor.

2. Description of the Related Art

In recent years, it has become popular to output an image from a portable image reproducing apparatus such as a digital camera to an image display apparatus such as a digital television where the image can be appreciated.

The image is transferred to the image display apparatus as video data. While the image is displayed, the image is regularly transmitted as the video data even when the display of the image itself is not changed. For example, in a case where a still image stored in a digital camera is displayed on a television via a digital transmission interface which transmits digital data, the digital camera transmits the same still image on a continuous basis. For that reason, the electric power stored in the battery of the portable image reproducing apparatus is consumed, and there is a problem that the reproduction is stopped during the image appreciation.

In order to ameliorate this problem, for example, Japanese Patent Laid-Open No. 09-284614 discloses a technology for changing a frame rate of output video data in accordance with the electric power remaining in the battery of the portable image reproducing apparatus to extend an image producing period by saving the electric power.

However, like other prior art, according to a method disclosed in Japanese Patent Laid-Open No. 09-284614, the video data is transmitted to an external display device on a continuous basis, and the problem that the electric power stored in the battery runs out and the reproduction is stopped during the image appreciation is not fundamentally solved.

SUMMARY OF THE INVENTION

The present invention provides an image reproducing apparatus in which it is possible to prevent an interruption of an image display as the electric power stored in a battery of a portable image reproducing apparatus is running out, and a control method therefor.

According to one aspect of the present invention, an image reproducing apparatus is provided for use with a video data transmitting unit that can transmit video data to a display device and a file data transmitting unit that can file data to the display device, wherein a battery powers the image reproducing apparatus. The image reproducing apparatus includes a calculating unit configured to calculate a first electric power required to transmit image data stored in a storage unit to the display device as the video data and a second electric power required to transmit the image data to the display device as the file data; an acquiring unit configured to acquire a remaining amount of electric power in the battery; a comparing unit configured to compare the remaining amount of electric power the battery acquired by the acquiring unit with both the first electric power and the second electric power calculated by the calculating unit and generates a first comparison result; and a determination unit configured to determine whether the image data is transmitted to the display device as the video data or the file data based on the first comparison result.

According to another aspect of the present invention, a control method for an image reproducing apparatus is provided, wherein the image reproducing apparatus is for use with a video data transmitting unit that can transmit video data to a display device and a file data transmitting unit that can file data to the display device, wherein a battery powers the image reproducing apparatus. The control method includes calculating a first electric power required to transmit image data stored in a storage unit to the display device as the video data and a second electric power required to transmit the image data to the display device as the file data; acquiring a remaining amount of the battery; comparing the remaining amount of electric power in the battery with the first electric power and the second electric power and generating a first comparison result; and determining whether the image data is transmitted to the display device as the video data or the file data based on the first comparison result.

Other features and advantages of the present invention will be apparent from the following description taken in conjunction with the accompanying drawings, in which like reference characters designate the same or similar parts throughout the figures thereof.

DESCRIPTION OF THE EMBODIMENTS

Preferred embodiments of the present invention will now be described in detail in accordance with the accompanying drawings.

First Exemplary Embodiment

Figure 1:
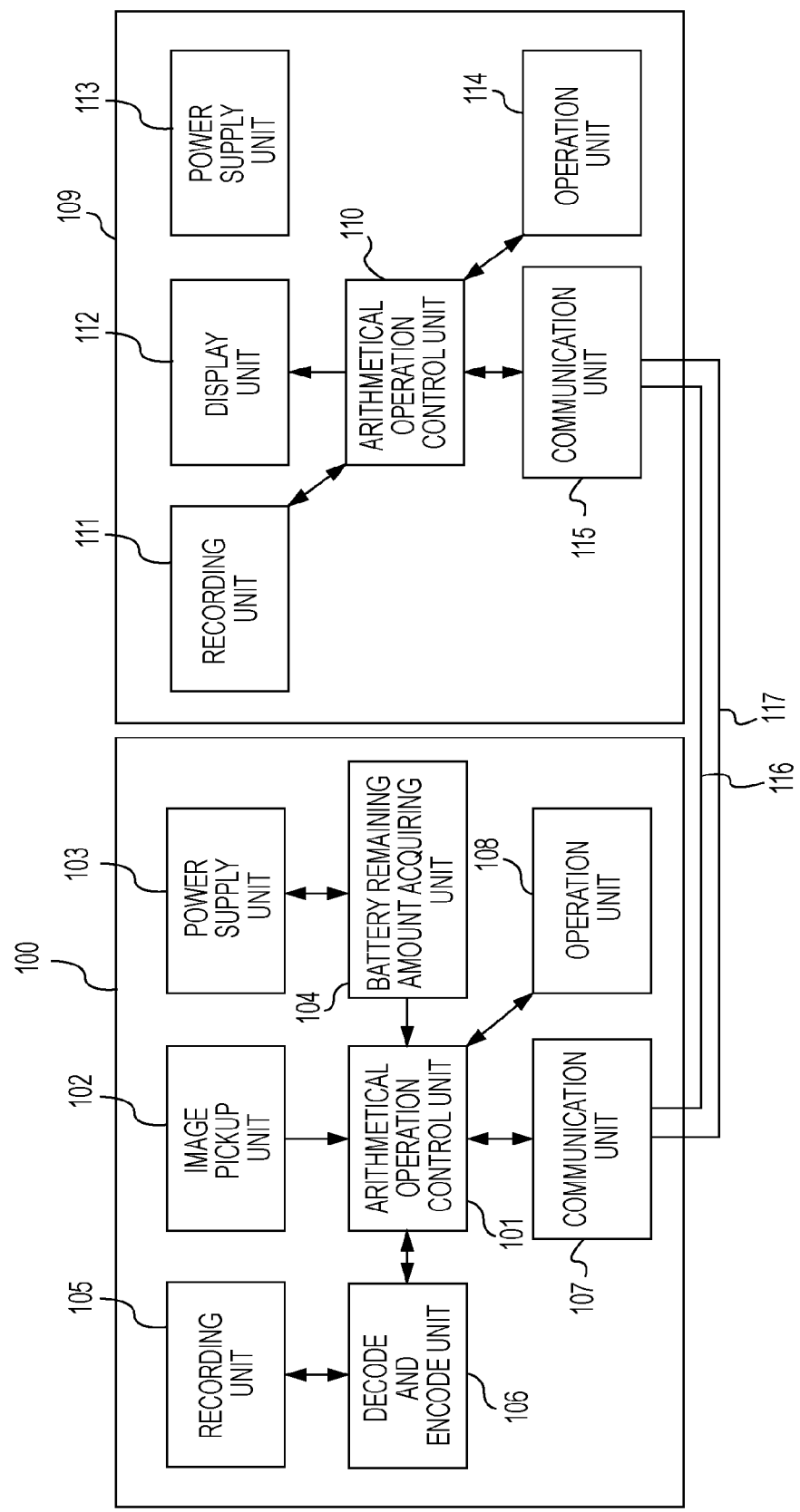
FIG. 1 is a block configuration diagram of an image reproducing system according to an embodiment of the present invention.

FIG. 1 is a block configuration diagram of an image reproducing system according to an embodiment of the present invention.

In the present image reproducing system, an image reproducing apparatus 100 is connected to a display device 109 via a video data transmitting unit 116 and file data transmitting unit 117.

Herein, according to the present image reproducing system, the image reproducing apparatus 100 and the display device 109 are connected to each other via the video data transmitting unit 116 that can transfer video data (video signal) and the file data transmitting unit 117 that can transfer file data. The respective transmitting units may be physically independent or may be composed of a single cable.

Examples of the image reproducing apparatus 100 include an apparatus which can perform an image reproduction and is powered by a battery, such as a digital camera, a PDA, or a mobile phone. It is desirable for the apparatus to have a dedicated circuit for decoding and encoding the image in the same manner or similarly to an image pickup apparatus.

In the image reproducing apparatus 100, an arithmetical operation control unit 101 performs an overall control of the image reproducing apparatus 100 and various arithmetical operations. The arithmetical operation control unit 101 can be composed, for example, of a CPU, a ROM, and a RAM, or an integrated circuit such as a micro computer having an equivalent function to the above-described components.

An image pickup unit 102 is configured to perform an image pickup. The image pickup unit 102 is composed of a lens and an image pickup element such as a CCD array or a CMOS array. A power supply unit 103 is configured to supply electric power to the image reproducing apparatus 100. The power supply unit 103 is composed of a power supply control circuit and a battery. The battery may be a primary battery or a secondary battery.

A battery remaining amount acquiring unit 104 is configured to measure an amount of electric power remaining in the battery included in the power supply unit 103. The battery remaining amount acquiring unit 104 may be composed, for example, of a voltage or current detection circuit and a control circuit therefor, or the like. A recording unit 105 is configured to record an image of the image reproducing apparatus 100 and various data. The recording unit 105 is composed of a non-volatile memory device such as a flash memory and a control circuit therefor. The image is recorded in the recording unit 105 in a JPEG format, a RAW format, or the like.

A decode and encode unit 106 is configured to decode and encode the image recorded in the recording unit 105 into other format. For example, the decode and encode unit 106 is used for converting the picked up image into the JPEG format or the like. The decode and encode unit 106 can be composed, for example, of a CPU, a ROM, and a RAM, or an integrated circuit such as a micro computer having an equivalent function to the above-described components. Also, the decode and encode unit 106 may share hardware with the arithmetical operation control unit 101.

A communication unit 107 is configured to perform a communication control on data such as a command, video data, or an image file with respect to an external device. HDMI, DVI, or the like can be used as a protocol for transmitting the video data, although any other protocol may alternatively by used. In addition, USB, IEEE1394, or the like may be used as a protocol for transmitting the file data, although any other protocol may alternatively be used. Furthermore, these transmissions are not necessarily based on wired communication but may alternatively be based on wireless communication.

An operation unit 108 is configured to operate the image reproducing apparatus 100. The operation unit 108 is composed of a button, an arrow key, or the like. When a user operates the operation unit 108, an operation command is sent to the arithmetical operation control unit 101. Alternatively, an operation command may be sent from an external device via the communication unit 107.

An exemplary structure of the display device 109 will now be described. The display device 109 is configured to display the video signal (video data) or the image file (file data) sent from the image reproducing apparatus 100. Examples of the display device 109 include a digital television and a PC.

In the display device 109, an arithmetical operation control unit 110 is configured to perform an overall control on the display device 109 and various arithmetical operations. The arithmetical operation control unit 110 can be composed, for example, of a CPU, a ROM, and a RAM, or an integrated circuit such as a micro computer having an equivalent function to the above-described components.

A recording unit 111 is configured to record various types of data of the display device 109. The recording unit 111 is composed of a non-volatile memory such as a RAM, a flash memory, or hard disc, and a control circuit therefor.

A display unit 112 is composed of a display panel made of liquid crystal, plasma, an organic EL or the like, and a control circuit therefor. A power supply unit 113 is configured to supply electric power to the display device 109. The power supply unit 113 is composed of a power supply control circuit or the like.

An operation unit 114 is composed of a button, an arrow key, or the like. The operation unit 114 may be composed of a remote controller, for example. A communication unit 115 is configured to provide communication control on data such as a command, video data, and image file data, with respect to an external device. The communication unit 115 is required to have the same communication protocol as that for the communication unit 107 of the image reproducing apparatus 100.

As described above, the video data transmitting unit 116 is configured to transmit the video data between the image reproducing apparatus 100 and the display device 109. Then, the file data transmitting unit 117 is configured to transmit the image file and data such as a command between the image reproducing apparatus 100 and the display device 109. The video data transmitting unit 116 and the file data transmitting unit 117 are composed of respective cables for transmission or the like. Any configuration of such cable may be adopted. Furthermore, the video data transmitting unit 116 and the file data transmitting unit 117 are not limited to a wired communication mode.

In other words, according to the image reproducing system for applying the present invention, both the image reproducing apparatus 100 and the display device 109 have a communication interface for transmitting video data and a communication interface for transmitting the file data, a command, and the like.

Figure 2:
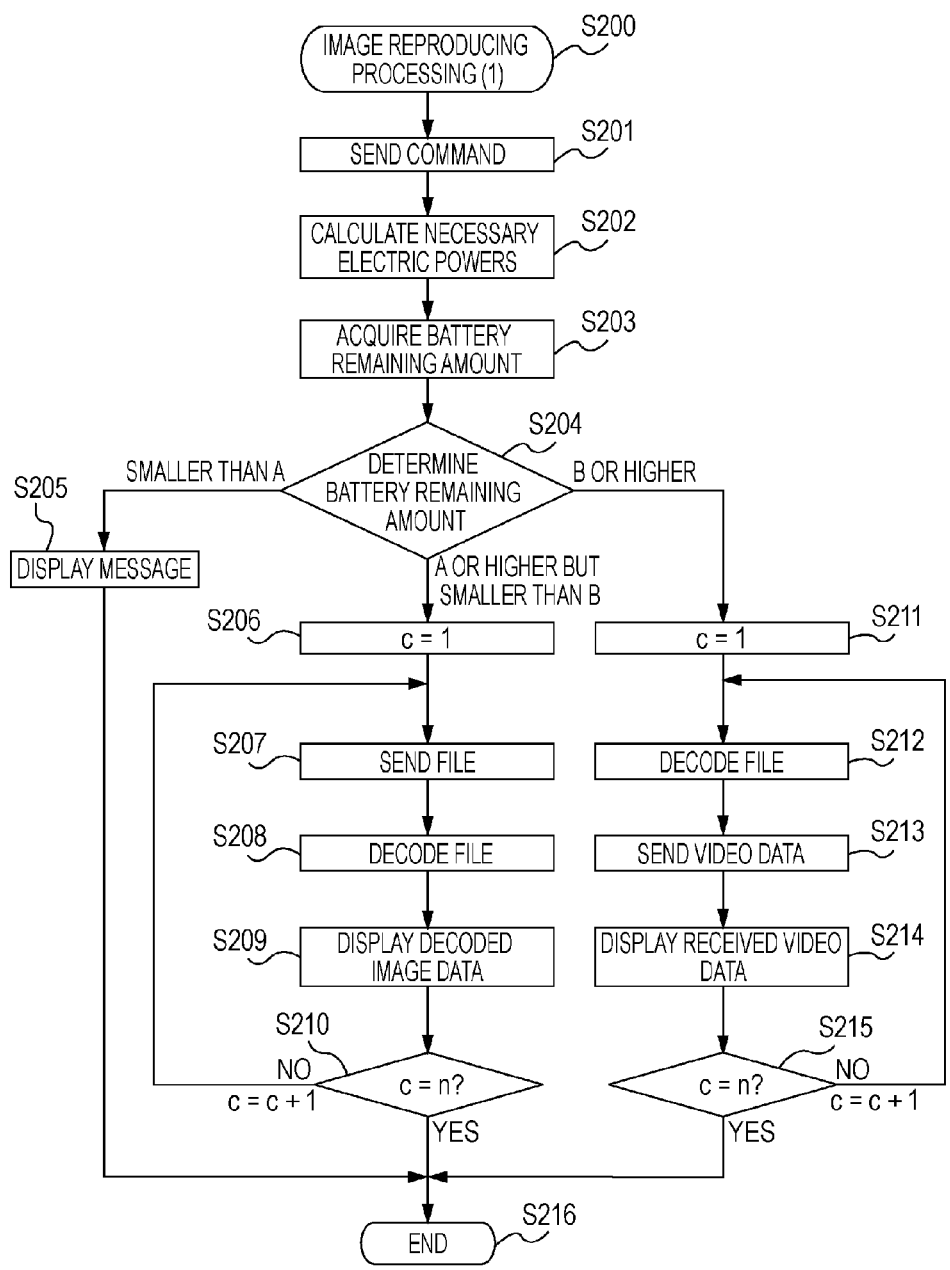
FIG. 2 is a flowchart of a procedure for image reproducing processing executed by the image reproducing system illustrated in FIG. 1 according to a first exemplary embodiment of the present invention.

FIG. 2 is a flowchart of a procedure for image reproducing processing executed by the image reproducing system illustrated in FIG. 1 according to a first exemplary embodiment of the present invention.

The present processing is executed by the arithmetical operation control unit 101 and the arithmetical operation control unit 110 illustrated in FIG. 1.

A slide show display is disclosed in which plural pieces of image data are continuously reproduced is disclosed. The slide show display is controlled so that the display of the plural pieces of image data which are requested to be displayed is not interrupted in the course of the slide show display.

In FIG. 2, the image reproducing processing is initiated in step S200. In step S201, a command for reproducing the target image data is sent to the arithmetical operation control unit 101 of the image reproducing apparatus 100 in accordance with an instruction input of the slide show display. The user may issue the command either by operating the operation unit 108 of the image reproducing apparatus 100 or by using the operation unit 114 of the display device 109. Herein, the number of image data pieces (n) which are set as the slide show display targets and a value (t second) indicating a switching interval of display images in the slide show display are specified.

Next, in step S202, the arithmetical operation control unit 101 calculates the following values based on the number of image data pieces (n) and a total display time of the slide show (t×n) and a total data amount of the n image data pieces which are set as the slide show target images. Electric powers required to execute the slide show are calculated. The arithmetical operation control unit 101 functions as a calculating unit to calculate:

an electric power [A] required to transmit the n image data pieces to the display device 109 as file data and an electric power [B] required to transmit the image to the display device 109 for t×n seconds as video data.

The electric power calculations are described next. Both the electric powers are obtained through addition of a first value and a second value, where the first value is obtained by multiplying an average electric power (W1) used for the communication operation by a communication operation time (T1), and the second value is obtained by multiplying an average electric power (W2) used for operations other than the communication operation such as data reading from the recording unit and the decode processing by an operation time (T2) thereof. In other words, values of (W1×T1)+(W2× T2) are established file data and video data respectively.

For example, regarding the electric power A, when it is assumed that the transmission of the file data is performed by using the USB, the average electric power W1 is an average electric power consumed while an output I/O of the USB is operated. Also, the communication operation time T1 is a value obtained by dividing the total data amount of the file data to be sent by a file transfer speed of the USB. The average electric power W2 is an average electric power related to operations other than the communication operation, and T2 is a value obtained by dividing the total data amount by a speed of other operations (for example, a data read out speed from the recording unit).

As another example, regarding the electric power B, when it is assumed that the transmission of the video data is performed by using the HDMI, the average electric power W1 is an average electric power consumed while an output I/O of the HDMI is operated. Then, the communication operation time T1 is obtained by t×n. The average electric power W2 is an average electric power related to operations other than the communication operation, and T2 is also obtained by t×n.

The above-described electric power calculations are merely examples and are not intended to limit the present invention. When the image data is transmitted as the file data, the image data is decoded in the display device 109. For that reason, the processing takes more time as compared to a case of transmitting video data to the display device 109 and displaying the transmitted video data. In addition, a decode processing is generated in the display device 109. Because all the images that should be displayed are sent as the file data, the operation of the image reproducing apparatus 100 becomes unnecessary after the transmission is ended. Therefore, the image reproducing apparatus 100 can perform the processing with a small remaining amount of the electric power in the battery of the power supply unit 103.

In contrast, in order to transmit the image data as the video data, the decode processing in the display device 109 or the like is not used. Thus, the processing in the display device 109 is reduced. In addition, the time required for the display is also shortened as compared with the transmission of the file data. However, the video data is regularly transmitted, and therefore the image reproducing apparatus 100 consumes much electric power.

Therefore, according to the present embodiment, in the slide show display, the respective necessary electric powers used in a case where the image reproducing apparatus 100 transmits the image data as the file data and used in a case where the image reproducing apparatus 100 transmits the image data as the video data are calculated. After that, the electric powers are compared with the remaining amount of the battery of the image reproducing apparatus 100. Then, by using a result of the comparison, the transmission method to be used for performing the slide show display with certainty is determined.

In step S203, an arithmetical operation control unit 101 issues to the battery remaining amount acquiring unit 104 a command to acquire the remaining amount of electric power in the battery. Subsequently, in step S204, the arithmetical operation control unit 101 compares the electric powers A and B calculated in step S202 with the remaining amount of the battery acquired in step S203. The arithmetical operation control unit 101 thus functions as a comparing unit in step S204.

In a case where a result of the comparison in step S204 indicates that the remaining amount of electric power in the battery is smaller than the electric power A, the flow is shifted to step S205. In a case where the result of the comparison in step S204 indicates that the remaining amount of electric power in the battery is equal to or larger than the electric power A but smaller than the electric power B, the flow is shifted to step S206. In a case where the result of the comparison in step S204 indicates that the remaining amount of the battery is equal to or larger than the electric power B, the flow is shifted to step S211. In other words, in step S204, the calculated electric powers A and B are compared with the remaining amount of electric power in the battery, and the data transmission method to be used when the image data is transmitted to the display device 109 and displayed are determined. Thus, the arithmetical operation control unit 101 also functions as a determination unit in step S204.

In a case where the remaining amount of the battery is smaller than A, it is determined that the current remaining amount of the battery cannot display all the image data set as the target for the slide show display.

In step S205, the arithmetical operation control unit 101 sends a command to the display device 109 so as to display a warning to the user that the remaining amount of the battery is insufficient. Considerable examples include, for example, "no remaining amount of power in the battery, please charge the battery" etc. At this time, the arithmetical operation control unit 101 may alternatively send a video for displaying a warning message to the display device 109 instead of the command. After step S205, the present processing is ended in step S216.

Next, a description will be provided of a process flow in a case where the arithmetical operation control unit 101 determines that the remaining amount of the battery is equal to or larger than the electric power A but smaller that the electric power B. In a case where the remaining amount of the battery is equal to or larger than the electric power A but smaller that the electric power B, it is determined that with the current remaining amount of electric power in the battery, the image data set as the target for the slide show display cannot be transmitted as the video data but can be transmitted as the file data. In step S206, the arithmetical operation control unit 101 initiates a variable c equal to one (c=1), which indicates what number of the images is currently the display target for the slide show. At the time of the execution start of the slide show, c=1 is established. Next, in step S207, the arithmetical operation control unit 101 executes a processing to send the image data (as the file data) to the display device 109 via the communication unit 107 and the file data transmitting unit 117. Through the processing of the arithmetical operation control unit 101, the image data recorded in the recording unit 105 is read out. After that, the image data is converted into the file data in the JPEG format or the RAW format. Of course, the data recorded in the recording unit 105 as the file data can also be used as it is. The file data is transmitted to the display device 109 by the communication unit 107. The sent file data is recorded in the recording unit 111 of the display device 109.

Steps S208 and S209 are steps to be executed by the display device 109. In step S208, the arithmetical operation control unit 110 of the display device 109 decodes the image data sent from the image reproducing apparatus 100 and recorded in the recording unit 111. In a case where the arithmetical operation control unit 110 is not provided with the decode function of the hardware, the image data is decoded by software.

In step S209, the image data decoded in step S208 is displayed on the display unit 112.

Next, in step S210, the arithmetical operation control unit 101 compares the variable c with the number of image data pieces n as the targets for the slide show display. In a case where c and n are matched to each other, the present process is ended. In a case where c and n are not matched to each other, 1 is added to the value of c and the flow is returned to step S207.

From this point, until the variable c becomes equal to the number of image data pieces n as the targets for the slide show display, the above-described process is repeatedly performed. Through this repeated process, the slide show display is executed in the display device 109.

In step S207, during a period after the sending of the file data is completed and before the next sending of the file data is generated, the image reproducing apparatus 100 has no processing generated related to the slide show, and thus it is possible to reduce the electric power consumption.

Subsequently, a description will be provided of a process flow in a case where it is determined in step S204 that the remaining amount of electric power in the battery is equal to or larger than the electric power B. In a case where the remaining amount of electric power in the battery is equal to or larger than the electric power B, with the current remaining amount of electric power in the battery, the image data set as the target for the slide show display can be transmitted as the video data.

In step S211, the arithmetical operation control unit 101 initiates the variable c equal to one (1), which indicates what number of the images is currently the display target for the slide show. In step S212, the arithmetical operation control unit 101 reads out the image data set as the slide show display target from the recording unit 105 and sends the image data to the decode and encode unit 106. Then, the decode and encode unit 106 decodes the image data as the video data.

In step S213, the decoded video data is output from the communication unit 107, and sent via the video data transmitting unit 116 to the communication unit 115 of the display device 109.

In step S214, the arithmetical operation control unit 110 of the display device 109 displays the video data sent in step S213 on the display unit 112.

In step S215, the arithmetical operation control unit 101 compares the variable c with the number of image data pieces n as the targets for the slide show display. In a case where c and n are matched to each other, the present process is ended in step S216. In a case where c and n are not matched to each other, 1 is added to the value of c and the flow is returned to step S212.

From this point, until the variable c becomes equal to the number of image data pieces n as the targets for the slide show display, the above-described process is repeatedly performed. Through this repeated process, the slide show display is executed in the display device 109.

It is noted that in the flow from step S206 to step S210, the file data is sent from the image reproducing apparatus 100 to the display device 109 one by one. However, at the display start of the slide show, all the pieces of the file data of the slide show display target images may alternatively be collectively sent and saved in the recording unit 111 of the display device 109. The effects of the present invention can be attained by sequentially decoding and reproducing the file data of the target images on the display device 109.

Also, in step S201, as image reproduction commands, of course, commands for enlargement, reduction, shift, rotation, and the like may be sent at the same time.

As described above, according to the present embodiment, the remaining amount of electric power in the battery of the image reproducing apparatus is compared with the electric powers required for the file data transmission and the video data transmission to determine the data transmission method to be used with respect to the connected device. For that reason, in a case where the remaining amount of electric power in the battery is sufficient, the dedicated hardware of the image reproducing apparatus decodes the image data and transmits the image data as the video data, and it is therefore possible to perform the high speed image display.

In a case where the remaining amount of electric power in the battery is small, the video data is not continued to be sent from the image reproducing apparatus. Thus, it is possible to save the electric power and also the interruption of the slide show display can be prevented.

Second Exemplary Embodiment

Figure 3:
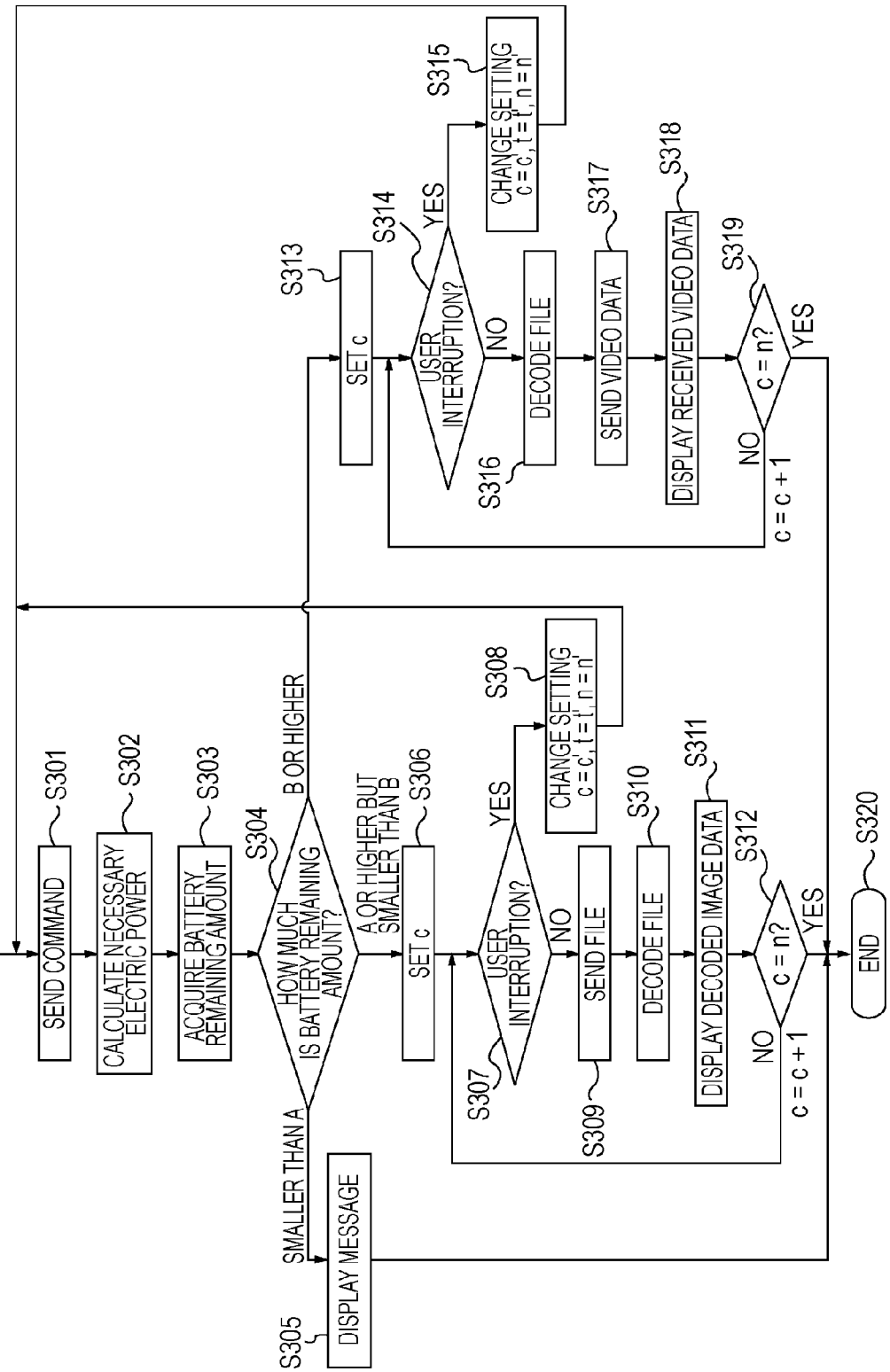
FIG. 3 is a flowchart of a procedure for image reproducing processing executed by the image reproducing system illustrated in FIG. 1 according to a second exemplary embodiment of the present invention.

FIG. 3 is a flowchart of a procedure according to a second exemplary embodiment of the present invention and which is executed by the image reproducing system illustrated in FIG. 1.

The present processing is executed by the arithmetical operation control unit 101 and the arithmetical operation control unit 110 illustrated in FIG. 1.

The present embodiment has a feature in a process to cope with a case in which an irregular situation is generated during the slide show display, for example, the user performs an operation such as pause of the image or display skip during the slide show display.

Some steps in the flowchart illustrated in FIG. 3 are the same as those in the flowchart illustrated in FIG. 2, and therefore only processing steps unique to the present embodiment will be described below.

The image reproducing processing is initiated in step S300. Steps S301, S302, S303, S304, and S305 are the same as steps S201, S202, S203, S204, and S205 respectively, except that the processing flow proceeds along a path from step S301, to step S302, to step 303, to step S304, and either to step S305, S306 or S313 depending respectively on whether the remaining amount of electric power in the battery is smaller than A, A or higher but smaller than B, or B or higher.

In step S306, the arithmetical operation control unit 101 sets the variable c, which indicates what number of the images is currently the display target for the slide show. In a case where the value of the variable c is previously set, the value is saved. In a case where the value of the variable c is not set, in other words, at the start of the slide show, c is set as 1.

In step S307, in a case where the interruption operation is performed by the user, the flow is shifted to step S308. In a case where there is no interruption operation, the flow is shifted to step S309. The interruption operation refers to an operation to execute such a control that the display setting of the slide show is changed, for example, the pause of the slide show, returning of the displayed image, the image skip, and the like. The user may perform the interruption operation alternatively by operating the operation unit 108 of the image reproducing apparatus 100, by using the operation unit 114 of the display device 109, or a remote controller. An instruction related to the interruption operation is input to the arithmetical operation control unit 101.

In step S308, the arithmetical operation control unit 101 changes the setting of the slide show through the operation instruction from the user in step S307. Responsive to the operation instruction, the values of the number of image data pieces n set as the slide show display targets, the switching interval time t, and the variable c are newly set respectively to n', t', and c'. Process flow then returns to step S301.

For example, in a case the pause of the slide show is performed by the user when a certain image is displayed and the slide show is resumed later, the previously set values of n, t, and c are saved. In a case where the user operates to return the image to one displayed two images before when a certain image is displayed, the previously set values of n and t are saved, and the value of c becomes a value obtained by subtracting 2 from the previously set value of c. Process flow is then returned to step S301. In step S301, the command is sent to the arithmetical operation control unit 101.

Step S309 is the same as step S207. Step S310 is the same as step S208. Step S311 is the same as step S209. Step S312 is the same as step S210. However, the process flow follows a path from step S309, to step S310, to step S311, and finally to step S312. In step S312, the arithmetical operation control unit 101 compares the variable c with the number of image data pieces n as the targets for the slide show display. In a case where c and n are matched to each other, the present process is ended in step 320. In a case where c and n are not matched to each other, 1 is added to the value of c and the flow is returned to step S307.

In step S313, the arithmetical operation control unit 101 sets the variable c, which indicates what number of the images is currently the display target for the slide show. In a case where the value of the variable c is previously set, the value is saved. In a case where the value of the variable c is not set, in other words, at the start of the slide show, c is set as 1.

Step S314 is equivalent to step S307. However, in a case where the interruption operation is performed by the user, the flow is shifted to step S315 to change the set values of the number of image data pieces n to n', the switching interval time t to t', and the variable c to c', as described above. Process flow then continues in step S301. In a case where there is no interruption operation, the flow is shifted to in step S316.

Step S316 is similar or equivalent to step S212. Step S317 is similar or equivalent to step S213. Step S318 is similar or equivalent to step S214. Step S319 is similar or equivalent to step S215. However, the processing flow is follows a path from step S316, to step S317, to step S318, to step S319. In step S319, the arithmetical operation control unit 101 compares the variable c with the number of image data pieces n as the targets for the slide show display. Where c and n are matched to each other, the present process is ended in step S320. Where c and n are not matched to each other, 1 is added to the value of c and the flow is returned to step S314.

According to the present embodiment, it is assumed that when the interruption operation by the user is received, the necessary electric powers calculated in step S302 vary. For example, originally the remaining amount of electric power in the battery is sufficient with which the image data can be transmitted as the video data. However, as an operation such as pause is generated by the user, the predicted time and the number of displayed images change. In addition, due to such an operation, naturally, there is a possibility that the electric power may be consumed more than expected.

In view of the above, according to the present embodiment, in a case where the interruption operation is performed by the user during the slide show, the remaining amount of electric power in the battery is compared again with the respective necessary electric powers for the file data transmission, and the video data transmission to determine the data transmission method with respect to the connected device. Depending on a case, in the middle of the slide show display, the video data transmission is switched to the file data transmission.

In this manner, in accordance with generation of the interruption operation, the checking operation regarding the optimal transmission method is executed each time.

Therefore, for example, such a situation can be prevented as much as possible that as a result of the interruption operation performed by the user, the remaining amount of electric power in the battery is running out in the middle of the slide show and the display is interrupted half way through.

The remaining amount of electric power in the battery in the above-described respective embodiments may refer to a value obtained by subtracting the total electric power of the battery by the consumed electric power. Therefore, even when the remaining amount of the battery is not directly acquired, the present invention can be embodied by acquiring the total electric power and the consumed electric power. That is, the present invention encompasses such a case that the total electric power and the consumed electric power are acquired and the necessary electric powers A and B are compared based on those values.

In addition, the configuration of the present invention can be achieved by executing the following processing. That is, a storage medium on which a software program code for realizing the above-described embodiments is recorded supplied to a system or an apparatus, and the program code stored on the storage medium is read out by a computer (or a CPU or an MPU) of the system or the apparatus.

In this case, the program code itself read out from the storage medium realizes the functions of the above-described embodiments, and the program code and the storage medium on which the program code is stored constitutes an embodiment of the present invention.

Also, the following products can be used as the storage medium for supplying the program code. For example, a flexible disk, a hard disk drive, an optical disk, an opto-magnetic disk, a CD-ROM, a CD-R, a CD-RW, a DVD-ROM, a DVD-RAM, a DVD-RW, a DVD+RW, a magnet tape, a non-volatile memory card, a ROM, or the like may be used. In addition, the program code may be downloaded via a network.

The present invention of course includes not only a case where the program code read out by the computer is executed to realize the functions of the above-described embodiments. In addition, the present invention includes a case where a part or all of the actual process is performed by an operation system (OS) running on the computer in accordance with an instruction of the program code and the process realizes the functions of the above-described embodiments.

Furthermore, the present invention of course includes a case where the above-described embodiments are realized by the following process. That is, the program code read out from the storage medium is written in a memory that is provided to a function expansion board inserted in the computer or a function expansion unit connected to the computer. After that, in accordance with an instruction of the program code, a CPU or the like provided to the function expansion board or the function expansion unit performs a part or all of the actual process.

With the above-described configuration, the transmission modes can be switched based on the determination result of the electric powers, and it is therefore possible to prevent the interruption of the image display as the battery of the portable image reproducing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2006-332409 filed Dec. 8, 2006, which is hereby incorporated by reference herein in its entirety.

What is claimed is:

1. An image reproducing apparatus for use with a video data transmitting unit that can transmit video data to a display device and a file data transmitting unit that can transmit file data to the display device, wherein a battery powers the image reproducing apparatus, and the video data is obtained by decoding the file data, the image reproducing apparatus comprising:
   a processor;
   a calculating unit configured to use the processor to calculate a first electric power required to transmit image data stored in a storage unit to the display device as the video data and a second electric power required to transmit the image data to the display device as the file data;
   an acquiring unit configured to acquire a remaining amount of electric power in the battery;
   a comparing unit configured to compare the remaining amount of electric power in the battery acquired by the acquiring unit with both the first electric power and the second electric power calculated by the calculating unit and generates a first comparison result; and
   a determination unit configured to determine, using the first comparison result generated by the comparing unit, in a case where the comparison result of the comparing unit indicates that the remaining amount of electric power in the battery is equal to or larger than the first electric power, that the image data is to be transmitted as the video data to the display device by using the video data transmitting unit, and in a case where the comparison result of the comparing unit indicates that the remaining amount of electric power in the battery is equal to or larger than the second electric power and also is lower than the first electric power, that the image data is to be transmitted as the file data to the display device by using the file data transmitting unit.

2. The image reproducing apparatus according to claim 1, wherein the determination unit determines
   in a case where the first comparison result indicates that the remaining amount of electric power in the battery is lower than the second electric power, that the image data is not to be transmitted.

3. The image reproducing apparatus according to claim 1, wherein the calculating unit calculates the first electric power and the second electric power using the number of image data pieces which are reproduction targets and a reproduction interval of images.

4. The image reproducing apparatus according to claim 1, further comprising an instruction input unit configured to receive an instruction of an operation for controlling a display of the image data while the image data transmitted from the image reproducing apparatus is displayed and reproduced by the display device, wherein:
   the calculating unit respectively calculates the first electric power and the second electric power again after the instruction of the operation for controlling the display of the image data is received by the instruction input unit;
   the acquiring unit acquires the remaining amount of electric power in the battery again;
   the comparing unit compares again the recalculated first electric power and the recalculated second electric power with the remaining amount of electric power in the battery which is acquired again and generates a second comparison result; and
   the determination unit determines whether the image data is transmitted to the display device as the video data or the file data after the instruction input based on the second comparison result.

5. A control method for an image reproducing apparatus, the image reproducing apparatus for use with a video data transmitting unit that can transmit video data to a display device and a file data transmitting unit that can transmit file data to the display device, wherein a battery powers the image reproducing apparatus, and the video data is obtained by decoding the file data, the control method using a processor, the control method comprising:
   calculating, using the processor, a first electric power required to transmit image data stored in a storage unit to the display device as the video data and a second electric power required to transmit the image data to the display device as the file data;
   acquiring a remaining amount of electric power in the battery;
   comparing the remaining amount of electric power in the battery with the first electric power and the second electric power and generating a first comparison result; and
   determining, using the first comparison result, in a case where the first comparison result indicates that the remaining amount of electric power in the battery is equal to or larger than the first electric power, that the image data is to be transmitted as the video data to the display device by using the video data transmitting unit, and in a case where the first comparison result indicates that the remaining amount of electric power in the battery is equal to or larger than the second electric power and also is lower than the first electric power, that the image data is to be transmitted as the file data to the display device by using the file data transmitting unit.

6. The control method according to claim 5, wherein
   in a case where the first comparison result indicates that the remaining amount of electric power the battery is lower than the second electric power, determining that the image data is not to be transmitted.

7. The control method according to claim 5, further comprising calculating the first electric power and the second electric power using the number of image data pieces which are reproduction targets and a reproduction interval of images.

8. The control method according to claim 5, further comprising receiving an instruction of an operation for controlling a display of the image data while the image data transmitted from the image reproducing apparatus is displayed and reproduced by the display device, wherein:
   calculating the first electric power and the second electric power again after the instruction of the operation for controlling the display of the image data is received;
   acquiring the remaining amount of electric power in the battery again;
   comparing again the recalculated first electric power and the recalculated second electric power with the remaining amount of electric power in the battery which is acquired again and generating a second comparison result; and
   determining whether the image data is transmitted to the display device as the video data or the file data after the instruction input based on the second comparison result.

* * * * *